(12) United States Patent
Mahadevan et al.

(10) Patent No.: US 9,201,713 B1
(45) Date of Patent: Dec. 1, 2015

(54) REGISTERING AND CONTROLLING POLICIES OF APPLICATIONS

(71) Applicant: AMAZON TECHNOLOGIES, INC., Reno, NV (US)

(72) Inventors: Prasad Ramani Mahadevan, Chennai (IN); Aravind Santhanam, Chennai (IN); Vijay Kumbakonam Ramdas, Chennai (IN); Venkatesh Kancharla, Chennai (IN); Sathiya Vedamurthi Mookiah, Chennai (IN)

(73) Assignee: Amazon Technologies, Inc., Reno, NV (US)

(*) Notice: Subject to any disclaimer, the term of this patent is extended or adjusted under 35 U.S.C. 154(b) by 69 days.

(21) Appl. No.: 13/933,897

(22) Filed: Jul. 2, 2013

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ..................................... *G06F 9/541* (2013.01)

(58) Field of Classification Search
None
See application file for complete search history.

(56) References Cited

U.S. PATENT DOCUMENTS

| | | | |
|---|---|---|---|
| 2004/0168158 A1* | 8/2004 | Jensen et al. ................... | 717/136 |
| 2005/0132204 A1* | 6/2005 | Gouguenheim et al. ....... | 713/185 |
| 2005/0283284 A1* | 12/2005 | Grenier et al. ................... | 701/29 |
| 2006/0048044 A1* | 3/2006 | Genesereth et al. ........... | 715/503 |
| 2010/0235829 A1* | 9/2010 | Shukla et al. .................. | 717/177 |
| 2012/0047365 A1* | 2/2012 | Mercer .......................... | 713/168 |

* cited by examiner

*Primary Examiner* — H S Sough
*Assistant Examiner* — William C Wood
(74) *Attorney, Agent, or Firm* — Lindauer Law, PLLC

(57) ABSTRACT

Described herein are systems, computer readable mediums, and methods for enabling new policies for media devices to be registered and provided to one or more administrative devices. In one implementation, the media device receives conflicting requests for implementing a designated policy. To resolve the conflict, the media device may use conflict resolution data that is registered upon installation of an application.

20 Claims, 7 Drawing Sheets

REGISTERING AND CONTROLLING POLICIES OF APPLICATIONS

BACKGROUND

Media devices provide the potential to access to a wide variety of content. Users may wish to control this access, or other aspects of consumption of the content on these media devices.

Figure 1:
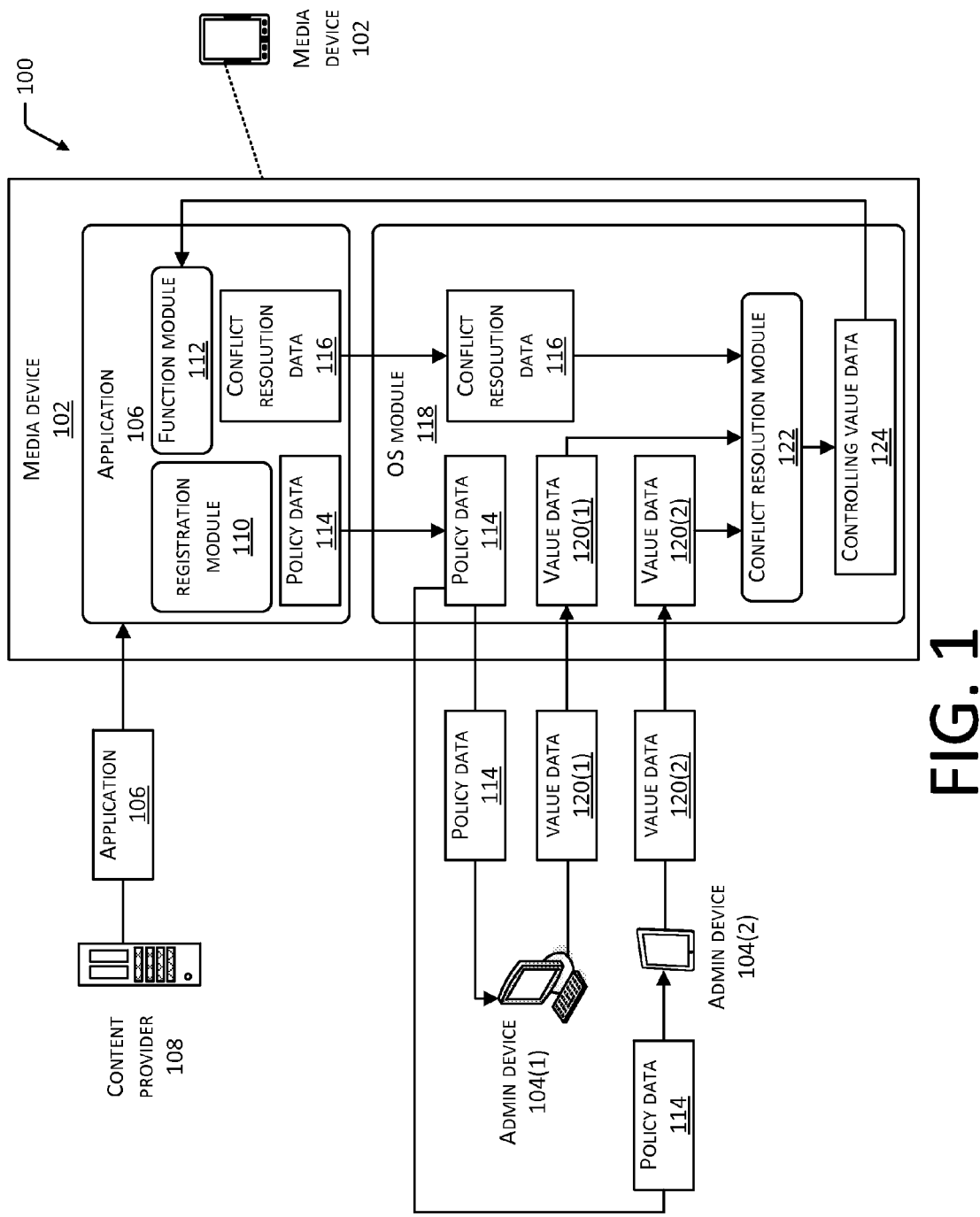
FIG. 1 is a block diagram of a system configured to register policy data and conflict resolution data with an operating system, and execute a function of an application using controlling value data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems and methods for controlling one or more applications executed by one or more media devices such as mobile digital devices, tablet computers, laptop computers, wearable computers, and so forth. An application may include computer software that causes the one or more media devices to perform one or more functions. For example, one application may include a book application configured to cause the media device to present a digital book, and another application may include an email application configured to enable users to exchange messages.

The application may include policy data which enables one or more users to request how one or more features of one or more applications will operate when the one or more applications are executed by the media device. The one or more features may comprise data representing one or more parts or characteristics of the one or more applications. For example, one feature may be the ability to block sports content for the application. Sports content as used in these examples is information which contains sports-related information such as text, graphics, and so forth. In this example, the policy data may enable one or more users to either block the sports content or allow the sports content. In other examples, other types of content may be blocked or allowed. The one or more users may be operating the media device or one or more administrative devices such as mobile digital devices, tablet computers, laptop computers, and so forth.

The media device may be configured to transmit the policy data to one or more administrative devices. The administrative device may be another media device. For example, the user of the media device may include a child, the user of a first administrative device may include a parent, and the user of a second administrative device may include a teacher. In this example, the child may cause the media device to download, from a content provider, a new application which includes policy data. The child's media device may be configured to transmit the policy data to the parent's administrative device and the teacher's administrative device, such that the parent and the teacher may request how one or more features of the new application will operate when the child's media device executes the new application. The new application may include a feature which causes the new application to block sports content. In this example, the parent may request that the new application block sports content and the teacher may request that the new application allow sports content. The child's media device may or may not block the sports content based on the conflicting requests. How the media device handles conflicting requests is described in more detail below.

In one implementation, when one or more users request how one or more features of one or more applications will operate, the administrative device generates value data representing the request. Continuing with the example, when the parent requests that the new application block sports content, the first administrative device generates first value data representing the request to block the sports content. Once the first value data is generated, the first administrative device transmits the first value data to the media device. When the teacher requests that the new application allow sports content, the second administrative device generates second value data representing the request to allow the sports content. Once the second value data is generated, the second administrative device transmits the second value data to the media device.

In some implementations, the application includes conflict resolution data which is used to resolve differences between different value data associated with the policy data. In one implementation, the conflict resolution data comprises Boolean logic data which reduces differences in value data to a value of yes or no, or true or false.

Based on the conflict resolution data, the media device generates controlling value data. The controlling value data may comprise data which may be used to execute the function of the application. Continuing with the example, the newly downloaded application may include conflict resolution data comprising Boolean logic data comprising a value of true. In this example, the value of true causes the media device to resolve differences between value data such that if at least one value data represents a request to block the sports content, the controlling value data causes the causes the new application to block the sports content. That is, because at least one of the parent and the teacher requested that the new application block the sports content (i.e., the parent), the new application is configured to block sports content when executed by the media device.

In some implementations, when the media device installs the application, the media device registers the policy data and the conflict resolution data with an operating system of the media device. In one example, the media device includes an installation module configured to install the application onto the media device. Installing the application may comprise making the application ready for execution. Installing the application may include at least one of: making sure that required system requirements are present; checking for existing versions of the application; creating or updating program files and folders; adding configuration data such as configuration files, or environment variables; creating links, shortcuts or bookmarks; configuring components that run automatically, such as daemons; or performing product activation.

By registering the policy data with the operating system of the media device, the media device may enable one or more users (e.g., administrative users) to manage multiple policies of multiple applications. Continuing with the example, the parent and the teacher may configure their administrative devices to present each policy for each application stored by the child's media device, including newly downloaded applications. By registering the conflict resolution data with the operating system of the child's media device, the child's media device resolves any differences in requests received from the parent's administrative device and the teacher's administrative device.

Illustrative System

FIG. 1 is a block diagram of a system 100 for registering policy data and conflict resolution data with an operating system, and generating controlling value data which is used as an input to the application. The system 100 includes a media device 102 and administrative devices 104(1) and 104(2) which are communicatively coupled using one or more networks. In this illustration, one media device 102 and two administrative devices 104(1), 104(2) are shown. In some implementations, the system 100 may include only one or more media devices 102, or the system 100 may include one or more media devices 102 and one or more administrative devices.

The media device 102 is configured to present, store, manipulate, or otherwise participate in the consumption of content. The media device 102 may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device and so forth. The media device 102 is discussed in more detail below with regard to FIG. 4.

The administrative devices 104(1) and 104(2) are configured to present, store, manipulate, or otherwise participate in the consumption of content. The administrative devices 104(1) and 104(2) may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device and so forth. In some implementations the one or more of the administrative devices 104(1) and 104(2) are the same type of device as the media device 102. The media device 102 and the administrative devices 104(1) and 104(2) may or may not be similar in construction, components, modules, and so forth. For example, the media device 102 may access a web interface or use an administrative application which enables the functionality of the administrative device 104.

The content may include audio data, video data, electronic book data, application data, game data, and so forth. The application data may be representative of an application 106. The application 106 may include computer software that causes the media device 102 to perform one or more functions such as presenting video data, presenting audio data, presenting digital books, and so forth.

The network facilitating communication between the media devices 102 and the administrative devices 104(1) and 104(2) may include a variety of networks, such as a local network, a wide area network ("WAN"), broadcast network, a personal area network, a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth Special Interest Group, and so forth. In some implementations, the devices and systems described herein are configured to directly connect to each other. The system 100 may include additional servers which communicate with the media devices 102 and the administrative devices 104(1) and 104(2).

As illustrated in FIG. 1, the media device 102 receives the application 106 from the content provider 108. As discussed in more detail below, in this implementation, the application 106 includes a registration module 110, a function module 112, policy data 114 and conflict resolution data 116.

The policy data 114 may enable one or more users of the administrative devices 104(1) and 104(2) to request how a feature of the application 106 will operate when the media device 102 executes the application 106. The feature may include a part or characteristic of the application 106. For example, the application 106 may include a book application which includes policy data 114 which enables the users of the administrative devices 104 (1) and 104(2) to specify the maximum book size the book application may download.

In some implementations, once the media device 102 receives the application 106, the registration module 110 registers the policy data 114 and the conflict resolution data 116 with an operating system ("OS") module 118 configured to manage hardware resources. For example, the application 106 may include a book application which includes first policy data 114 which enables users to specify the maximum book size in which the book application may download, and second policy data 114 which enables users to block specific book titles. In this example, once the media device 102 receives the book application, the media device 102 registers the first policy data 114 and the second policy data 114 with the OS module 118. By registering the policy data 114 with the OS module 118, the media device 102 enables users such as administrative users to manage multiple policies of multiple applications 106. To manage policies of the applications 106, the administrative users may not have to actively search for each policy of each application 106 downloaded by the media device 102, because each of the policies may be registered with the OS module 118. Using these techniques, as new policies continue to be created, the administrative users may readily implement new policies.

In this implementation, the function module 112 of the application 106 is configured to cause the media device 102 to provide one or more functions. For example, the function may include presenting a book, enabling users to exchange messages, presenting video data, presenting audio data, and so forth.

In FIG. 1, the media device 102 transmits the policy data 114 to the administrative devices 104(1) and 104(2). The media device 102 may transmit the policy data 114 to the administrative devices 104(1) and 104(2) in response to receiving a request for the policy data 114. In one implementation, the administrative devices 104(1) and 104(2) automatically transmit requests for the policy data 114 in response to a user of the administrative devices 104(1) and 104(2) logging onto the administrative devices 104(1) and 104(2). In some implementations, the media device 102 transmits notification data to the administrative devices 104(1) and 104(2), indicating that new policy data 114 has been registered with the media device 102. Once the administrative devices 104(1) and 104(2) receive the requested policy data 114, the administrative devices may automatically enable the administrative users to specify how the user would like for each feature of the application 106 to be implemented. Such a configuration may allow administrative users to quickly manage the features of the applications 106.

Once the administrative device 104(1) receives the policy data 114, the administrative device 104(1) may enable the user of the administrative device 104(1) to request how the feature of the application 106 will operate when the media device 102 executes the application 106. Continuing with the example, the user of the administrative device 104(1) requests for the maximum book size that the book application may download to be 2 megabytes ("MB").

In response to the user of the administrative device 104(1) requesting how he or she would like the feature of the application 106 to operate, the administrative device 104(1) may generate value data 120(1) representing the request. Continuing with the example, in response to the user of the administrative device 104(1) requesting that the maximum book size that the book application may download is 2 MB, the administrative device 104(1) may generate value data 120(1) representing the 2 MB request. Once the value data 120(1) is generated, as shown in FIG. 1, the administrative device 104(1) may transmit the value data 120(1) to the media device 102.

Referring to the administrative device 104(2), once the administrative device 104(2) receives the policy data 114, the administrative device 104(2) may enable the user of the administrative device 104(2) to request how he or she would like the feature of the application 106 to operate when the media device 102 executes the application 106. Continuing with the example, the administrative user of the administrative device 104(2) requests for the maximum book size that the book application may download to be 4 MB, which is different from the 2 MB request from described above.

In response to the user of the administrative device 104(2) requesting how he or she would like the feature of the application 106 to operate, the administrative device 104(2) may generate value data 120(2) representing the request. Continuing with the example, in response to the administrative user of the administrative device 104(2) requesting that the maximum book size that the book application may download is 4 MB, the administrative device 104(2) may generate value data 120(2) representing the 4 MB request. Once the value data 120(2) is generated, as shown in FIG. 1, the administrative device 104(2) may transmit the value data 120(2) to the media device 102.

As described in the example above, the requests for how the feature of the application 106 will operate may be different. In FIG. 1, a conflict resolution module 122 is configured to resolve the differences. As discussed below, the conflict resolution module 122 may generate controlling value data 124 which comprises data used to execute the function of the application 106. The conflict resolution module 122 may generate the controlling value data 124 using the conflict resolution data 116, the value data 120(1) and the value data 120(2). The conflict resolution data 116 may comprise data used to resolve differences between the value data 120(1) and the value data 120(2). Continuing with the example, the conflict resolution data 116 may comprise data which causes the differences in the value data 120(1) and 120(2) to be resolved such that the conflict resolution module 122 selects the maximum value associated with the value data 120(1) and value data 120(2). That is, where the value data 120(1) includes data representing a request for the maximum book size to be 2 MB, and the value data 120(2) includes data representing a request for the maximum book size to be 4 MB, in this example, the conflict resolution module 122 selects the 4 MB value and not the 2 MB value because the 4 MB is the largest value.

As shown in FIG. 1, in this implementation, the controlling value data 124 may be used as an input to the function module 112. Continuing with the example, if the user of the media device 102 requests the application 106 to download a designated book having a size of 3 MB, the function module 112 uses the controlling value data 124 to determine whether the designated book may be downloaded. Because in this example the controlling value data 124 includes data representing the maximum book size to be 4 MB, the designated 3 MB book may be downloaded, despite that the value data 120(1) indicated a request for the maximum book size to be 2 MB. In some implementations, the media device 102 may be configured to transmit notification data to the one or more administrative devices 104, indicating that the one or more administrative devices 104 has been overruled by another administrative device 104.

As discussed above, in some implementations, once the media device 102 receives the application 106, the registration module 110 registers the conflict resolution data 116 with the OS module 118. By registering the conflict resolution data 116 with the OS module 118, the media device 102 resolves one or more differences in requests received from the administrative devices 104(1) and 104(2).

Figure 2:
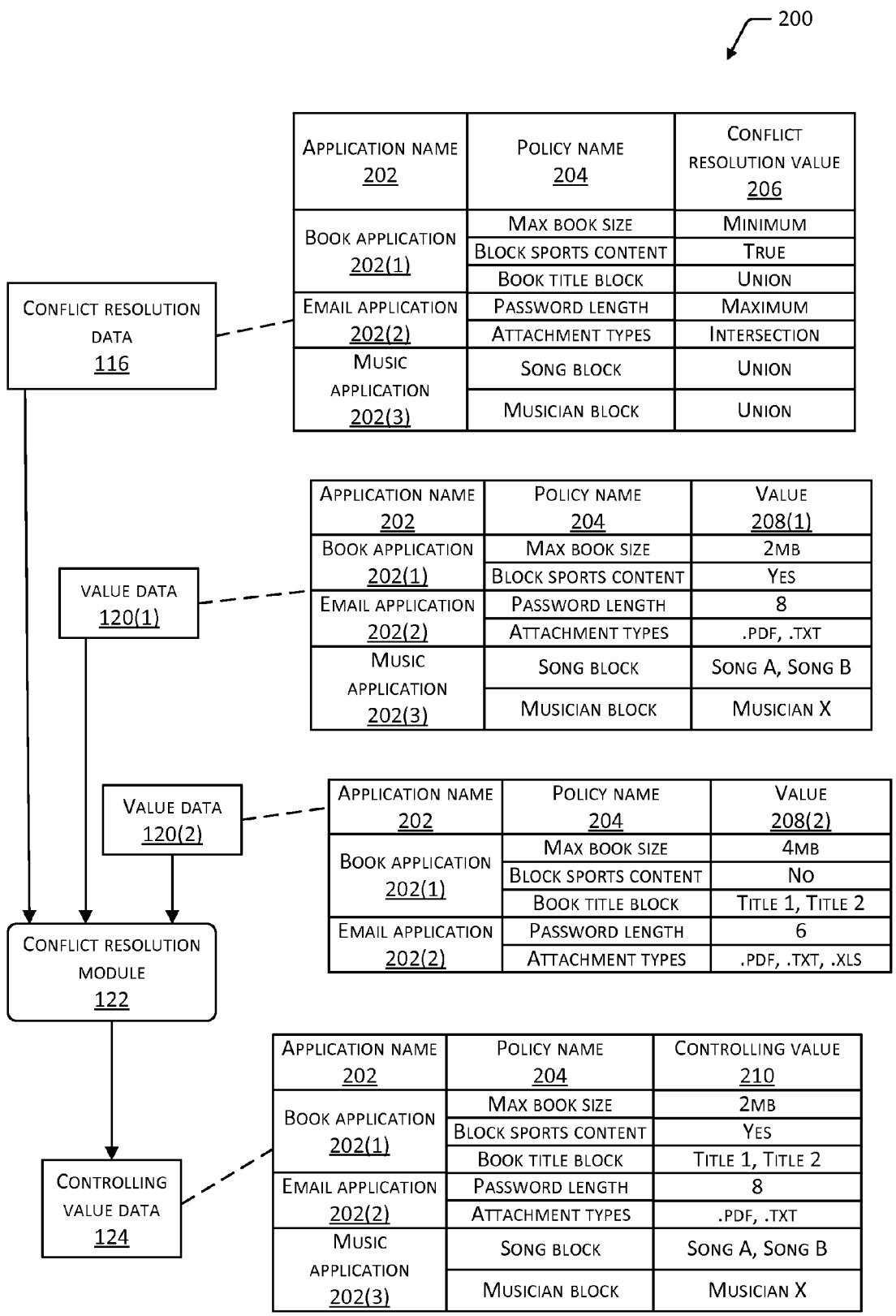
FIG. 2 is a block diagram of the conflict resolution module generating the controlling data using the conflict resolution data and a plurality of value data.

FIG. 2 is a block diagram 200 of the conflict resolution module 122 generating the controlling value data 124 using the conflict resolution data 116, the value data 120(1) and the value data 120(2). The controlling value data 124 may be used as an input to the function module 112.

As shown in FIG. 2, the conflict resolution data 116 may include data illustrated in a conflict resolution data table which includes the following fields: application name 202, policy names 204 and conflict resolution value 206. The conflict resolution values 206 are values used to resolve one or more differences between one or more value data 120, for a particular policy. The policy names 204 identify the different types of policies of the applications 106. The application names 202 identify example applications 106 which may be downloaded by the media device 102.

As illustrated by the conflict resolution data table, the book application 202(1) includes the following three policies 204: (a) max book size policy 204 which enables one or more users to request the maximum book size for which the book application 202(1) would be able to download; (b) block sports content policy 204 which enables one or more users to request the book application 202(1) to block sports content; and (c) book title block policy 204 which enables one or more users to request the book application 202(1) to block specified books.

The conflict resolution value 206 for the max book size policy 204 is set to a value of "minimum". The minimum value 206 causes the conflict resolution module 122 to resolve differences between value data 120 such that the conflict resolution module 122 selects the lowest value associated with the value data 120. An example of the application of the minimum value is described below.

The conflict resolution value 206 for the block sports content policy 204 is set to a value of "true". The true value 206 causes the conflict resolution module 122 to resolve differences between value data 120 such that the conflict resolution module 122 selects "yes" or "true" if at least one value data 120 includes data representative of "yes" or "true". An example of the application of the "true" value is described below.

The conflict resolution value 206 for the book title block policy 204 is set to "union". The union value 206 causes the conflict resolution module 122 to resolve differences between value data 120 such that the conflict resolution module 122 takes the union of the values specified by the value data 120. For example, first value data 120 may include a first set of values which include "Title 5", "Title 10", and "Title 12". The second value data 120 may include a second set of values which include "Title 6", "Title 7", and "Title 10". In this example, the union of the first set of values and the second set of values is "Title 5", "Title 6", "Title 7", "Title 10", and "Title 12".

The email application 202(2) includes the following two policies 204: (a) password length policy 204 which enables one or more users to request the length of a password for the email application 202(2); and (b) attachment types policy 204 which enables one or more users to request the types of files that may be attached to an email.

The conflict resolution value 206 for the password length policy 204 is set to "maximum". The maximum value 206 causes the conflict resolution module 122 to resolve differences between value data 120 such that the conflict resolution module 122 selects the highest value associated with the value data 120 associated with the password length policy 204. An example of the application of the maximum value is described below.

The conflict resolution value 206 for the attachment types policy 204 is set to "intersection". The intersection value 206 causes the conflict resolution module 122 to resolve differences between value data 120 such that the conflict resolution module 122 takes the intersection of the values specified by the value data 120. An example of the application of the intersection value is described below.

As shown in FIG. 2, the music application 202(3) includes the following two policies 204: (a) song block policy 204 which enables one or more users to request for the music application 202(3) to block designated songs; and (b) musician block policy 204 which enables one or more users to request for the music application 202(3) to block songs performed by designated musicians.

The conflict resolution value 206 for the song block policy 204 is set to "union". The union value 206 causes the conflict resolution module 122 to resolve differences between value data 120 such that the conflict resolution module 122 takes the union of the values specified by the value data 120. The conflict resolution value 206 for the musician block policy 204 is set to "union". The union value 206 causes the conflict resolution module 122 to resolve differences between value data 120 such that the conflict resolution module 122 takes the union of the values specified by the value data 120.

As shown in FIG. 2, the value data 120(1) may comprise data illustrated in a first value data table which includes the following fields: application name 202, policy name 204 and value 208(1). As described above, in some implementations, the value data 120(1) may be generated by the administrative device 104(1) based on inputs received from an administrative user.

The value 208(1) for the max book size policy 204 is set to "2 MB", indicating that a user has requested that the maximum size book in which the book application 202(1) may download is 2 MB. The value 208(1) for the block sports content policy 204 is set to "Yes", indicating that a user has requested that the book application 202(1) block sports content.

The value 208(1) for the password length policy 204 is set to "8", indicating that a user has requested that the email application 202(2) include a password length of 8 characters. The value 208(1) for the attachment types policy 204 includes a set of values which include ".pdf" and ".txt", indicating that a user has requested that the types of attachment files which may be attached in an email for the email application 202(2) include .pdf and .txt type files.

The value 208(1) for the song block policy 204 includes a set of values which include "Song A" and "Song B", indicating that a user has requested that the music application 202(3) block the following two songs: "Song A" and "Song B". The value 208(1) for the musician block policy 204 includes "Musician X", indicating that a user has requested the music application 202(3) block all songs which are performed by Musician X.

As shown in FIG. 2, the value data 120(2) includes data illustrated in a second value data table which includes the following fields: application name 202, policy name 204 and value 208(2). As described above, in some implementations, the value data 120(2) may be generated by the administrative device 104(2) based on inputs received from an administrative user. The second value data table does not include any values 208(2) for the music application 202(3) because, in this example, the administrative device 104(2) which transmitted the value data 120(2) to the media device 102 does not have rights to provide value data 120(2) for the music application 202(3).

The value 208(2) for the max book size policy 204 is set to "4 MB", indicating that a user has requested that the maximum size book in which the book application 202(1) may download is 4 MB. The value 208(2) for the block sports content policy 204 is set to "No", indicating that a user has requested that the book application 202(1) block sports content. The value 208(2) for the book title block policy 204 includes a set of values which include "Title 1" and "Title 2", indicating that a user has requested that the book application 202(1) block the books having the following titles: "Title 1" and "Title 2".

The value 208(2) for the password length policy 204 is set to "6", indicating that a user has requested that the password length to have a length of 6 characters. The value 208(2) for the attachment types policy 204 includes a set of values which include ".pdf", ".txt", and ".xls", indicating that a user has requested that the types of attachment files for the email application 202(2) include .pdf, .txt, and .xls type files.

Referring to the controlling value data 124, the controlling value data 124 includes data illustrated in a controlling value table which include the following fields: application name 202, policy name 204 and controlling value 210. The controlling value data 124 may be used as an input to the function module 112 when the application 106 executes a particular function.

The controlling value 210 for the max book size policy 204 is "2 MB" because the conflict resolution value 206 for the max book size policy 204 comprises the "minimum" value, and "2 MB" is the lowest value associated with the values 208(1) and 208(2). The controlling value 210 for the block sports content policy 204 is "Yes" because the conflict resolution value 206 for the block sports content policy 204 comprises the true value 206, and the value 208(1) for the block sports content policy 204 comprises the true value 206. The controlling value 210 for the book title block policy 204 is "Title 1" and "Title 2" because the conflict resolution value 206 for the book title block policy 204 comprises the union value 206, and the value 208(2) for the book title block policy 204 includes a set of values including "Title 1" and "Title 2".

The controlling value 210 for the password length policy 204 is "8" because the conflict resolution value 206 for the password length policy 204 is the maximum value 206, and 8 is the highest value associated with the values 208(1) and 208(2). The controlling value 210 for the attachment types policy 204 comprises ".pdf" and ".txt" because the conflict resolution value 206 for the attachment types policy 204 comprises the intersection value 206, and both the values 208(1) and 208(2) for the attachment types policy 204 include the ".pdf" and ".txt" values.

The controlling value 210 for the song block policy 204 is "Song A" and "Song B" because the conflict resolution value 206 for the song block policy 204 is the union value 206, and the value 208(1) includes the "Song A" and "Song B". The controlling value 210 for the musician block policy 204 is "Musician X" because the conflict resolution value 206 for the musician block policy 204 is the union value 206, and the value 208(1) includes the "Musician X".

Figure 3:
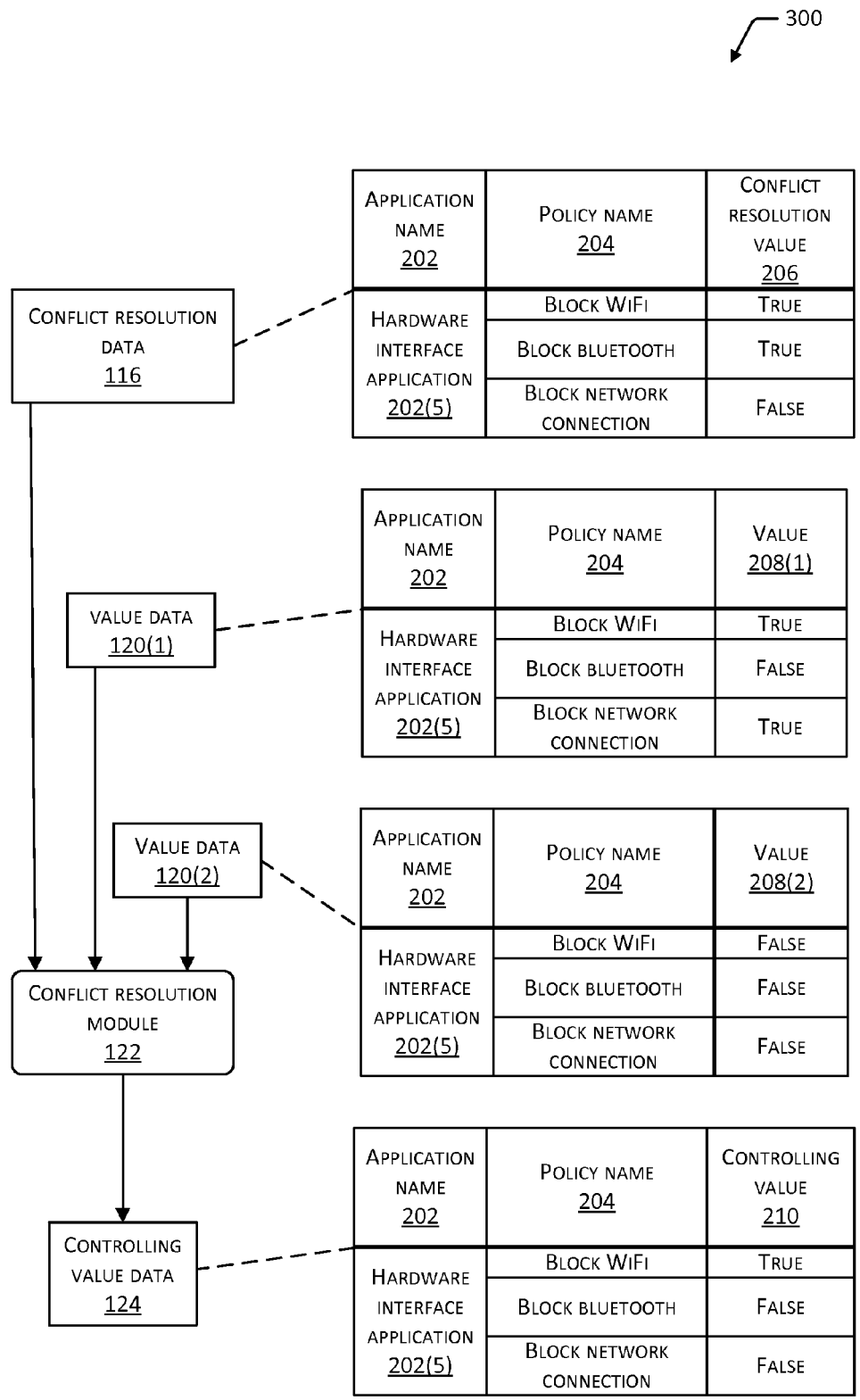
FIG. 3 is a block diagram of the conflict resolution module generating the controlling data for a hardware interface application using the conflict resolution data and a plurality of value data.

FIG. 3 is a block diagram 300 of the conflict resolution module 122 generating the controlling value data 124 for a hardware interface application 202(5). The hardware interface application 202(5) enables one or more users to request how designated hardware components of the media device 102 will operate. The conflict resolution module 122 generates the controlling value data 124 using the conflict resolution data 116, the value data 120(1) and the value data 120(2). In FIG. 3, the conflict resolution data 116 includes data illustrated in a table which includes the following fields: application name 202, policy names 204, and conflict resolution value 206.

As illustrated by the table for the conflict resolution data 116, the hardware interface application 202(5) includes the following three policies: (a) block Wi-Fi® which enables one or more users to request for the media device 102 to disable any Wi-Fi® connections; (b) block Bluetooth® which enables one or more users to request for the media device 102 to block any blue tooth connections; and (c) block network connection which enables one or more users to request the media device to disconnect from one or more network connections.

The conflict resolution value 206 for the block Wi-Fi® policy 204 is set to "true". The true value causes the conflict resolution module 122 to resolve differences between value data 120 such that the conflict resolution module 122 selects "yes" or "true" if at least one value data 120 includes data representative of "yes" or "true".

The conflict resolution value 206 for the block Bluetooth® policy 204 is set to "true". The true value 206 causes the conflict resolution module 122 to resolve differences between value data 120 such that the conflict resolution module 122 selects "yes" or "true" if at least one value data 120 includes data representative of "yes" or "true".

The conflict resolution value 206 for the block network connection policy 204 is set to "false". The false value 206 causes the conflict resolution module 122 to resolve differences between value data 120 such that the conflict resolution module 122 selects "no" or "false" if at least one value data 120 includes data representative of "no" or "false".

In FIG. 3, the value data 120(1) includes data illustrated in a table which includes the following fields: the application name 202, the policy name 204 and the value 208(1). The value 208(1) for the block Wi-Fi® policy is set to "true", indicating that a user has requested the media device 102 to disable Wi-Fi® connections. The value 208(1) for the block Bluetooth® is set to "false", indicating that a user has requested that the media device 102 allow blue tooth connections. The value 208(1) for the block network connections is set to "true", indicating that a user has requested that the media device 102 disconnect from one or more network connections.

The value data 120(2) may include data illustrated in a table which includes the following fields: application name 202, policy name 204 and value 208(2). The value 208(2) for the block Wi-Fi® policy is set to "false", indicating that a user has requested the media device 102 to allow Wi-Fi® connections. The value 208(2) for the block Bluetooth® is set to "false", indicating that a user has requested that the media device 102 allow blue tooth connections. The value 208(2) for the block network connections is set to "false", indicating that a user has not requested that the media device 102 disconnect from one or more network connections.

The controlling value data 124 may include data illustrated in a table which include the following fields: application name 202, policy name 204 and controlling value 210. The controlling value 210 for the block Wi-Fi® policy 204 is "true", indicating that the media device 102 is configured to block Wi-Fi® connections. The controlling value 210 for the block Bluetooth® policy 204 is "false", indicating that the media device 120 is configured to use Bluetooth® to connect to other devices. The controlling value 210 for the block network connection policy 204 is "false", indicating that the media device may connect to other networks.

The hardware interface application 202(5) may include a device driver (not shown) which may comprise software that operates or controls a particular device connected to the media device 102 or particular hardware of the media device 102. The device driver may interface with particular device such as printers, video adapters, network cards, sound cards, image scanners, digital cameras, and so forth. In one example, the device driver may enable one or more users to request to block or allow the use of a printer connected to the media device 102.

Figure 4:
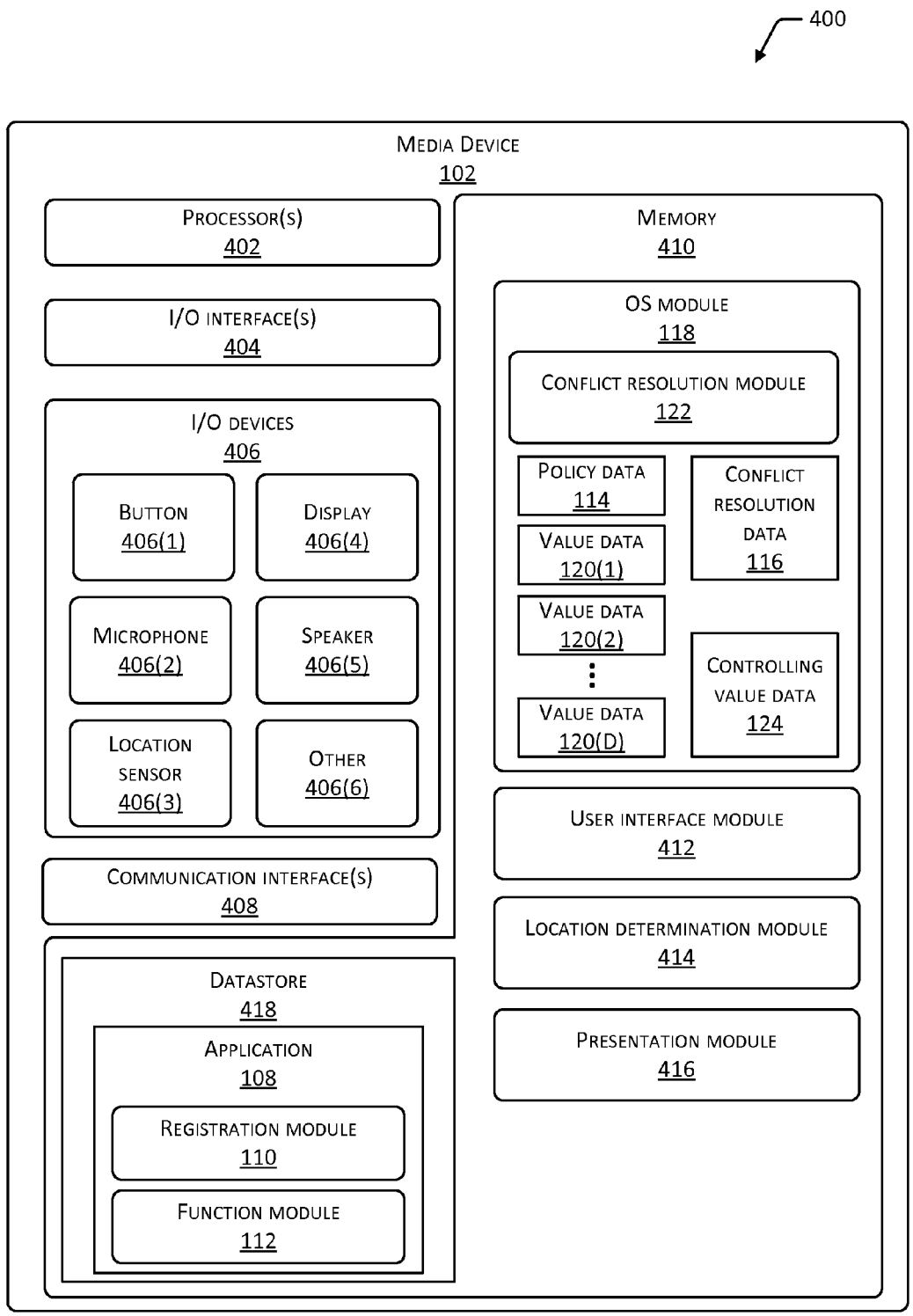
FIG. 4 is a block diagram of the media device configured to register policy data and conflict resolution data, and generate controlling value data.

FIG. 4 is a block diagram 400 of the media device 102 configured to register the policy data 114 and the conflict resolution data 116, and generate controlling value data 124. The media device 102 may include at least one processor 402 configured to execute stored instructions. The at least one processor 402 may comprise one or more cores.

The media device 102 includes at least one input/output ("I/O") interface 404 which enables portions of the media device 102 (e.g., the processor 402) to communicate with other devices. The I/O interface 404 may include inter-integrated circuit ("I2C"), serial peripheral interface bus ("SPI"), Universal Serial Bus ("USB"), RS-232, HDMI, TOSLINK, Bluetooth®, and so forth. The at least one I/O interface 404 may be communicatively coupled to at least one I/O device 406. In some implementations, certain I/O devices 406 are physically incorporated with the media device 102 or externally placed.

As illustrated in FIG. 4, the at least one I/O device 406 may include one or more input devices such as a button 406(1), a microphone 406(2) and a location sensor 406(3). The location sensor 406(3) may include an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a GLONASS receiver, a Galileo receiver, an Indian Regional Navigational Satellite System, and so forth. The I/O device 406 may include one or more of a variety of output devices such as one or more displays 406(4), speakers 406(5), and other I/O devices 406(6). The one or more display devices 406(4) may include electrophoretic displays, liquid crystal displays, interferometric displays, cholesteric displays, light emitting diode displays, projection displays, and so forth. The other I/O devices 406(6) may include a camera, a touch sensor and a haptic output device.

The media device 102 may include at least one communication interface 408. The communication interface 408 may be configured to provide communications between the media device 102 and other devices, such as the administrative devices 104, routers, access points, other servers, other media devices 102, and so forth. The communication interface 408 may connect to the network.

The media device 102 may include at least one bus or other internal communications hardware or software that enables for the transfer of data between the various modules and components of the media device 102.

As illustrated in FIG. 4, the media device 102 may include at least one memory or memory device 410. The memory 410 may include at least one computer-readable storage media ("CRSM"). The CRSM may include at least one of an electronic storage medium, a magnetic storage medium, an optical storage medium, a quantum storage medium, or a mechanical computer storage medium. The memory 410 may include computer readable instructions, data structures, program modules and other data for the operation of the media device 102.

The memory 410 may include the OS module 118. The OS module 118 may be configured to manage hardware resources such the I/O interface 404, the I/O device 406, the communication interface 408, and provide various services to applications or modules executing on the processor 402.

In this implementation, the OS module 118 includes the conflict resolution module 122 which is employed to resolve conflicts between the value data 120(1), 120(2), . . . 120(D). In other implementations, the OS module 118 does not include the conflict resolution module 122. For example, the memory 410 may include the conflict resolution module 122. The OS module 118 may include the policy data 114 and the conflict resolution data 116 that is registered by the application 106. In some implementations, the OS module 118 does not include the policy data 114 and the conflict resolution data 116. For example, the memory 410 may include the policy data 114 and the conflict resolution data 116. The OS module 118 may include the value data 120(1), 120(2), . . . 120(D). In some implementations, the OS module 118 does not include the value data 120(1), 120(2), . . . 120(D). For example, the memory 410 may include the value data 120(1), 120(2), . . . 120(D). In this example, the OS module 118 includes the controlling value data 124. In some implementations, the OS module 118 does not include the controlling value data 124. For example, the memory 410 may include the controlling value data 124. The memory 410 may also store at least one of the following modules which may be executed as foreground applications, background tasks, daemons, and so forth.

In some implementations, a user interface module 412 is configured to provide a user interface to the user using the I/O devices 406 and to accept inputs received from the I/O devices 406. The user interface may include one or more visual, audible, or haptic elements. For example, the user interface may be configured to provide a graphic user interface, an audible user interface, and so forth.

In FIG. 4, the location determination module 414 is configured to provide the location data of the media device 102 based at least in part on information received from the one or more location sensors 406(3). The location data may include any suitable data indicative of the location of the media device 102. The location data may include geolocation data which is indicative of the latitude and longitude of the media device 102, relative position such as "conference hall A", and so forth.

The presentation module 416 is configured to present the content. The presentation module 416 may be configured to present the content using one or more of the display device 406(4), the speaker 406(5), and so forth. For example, the presentation may include displaying the content using the display device 406(4).

In some implementations, the memory 410 includes a datastore 418 for storing information. The datastore 418 may use a flat file, database, linked list, tree, or other data structure to store the information. In some implementations, the datastore 418, or a portion thereof, may be distributed across at least one other device, such as a server, a network storage device, and so forth. As illustrated in FIG. 4, the datastore 418 may include the one or more applications 106.

Illustrative Scenarios and Processes

Figure 5:
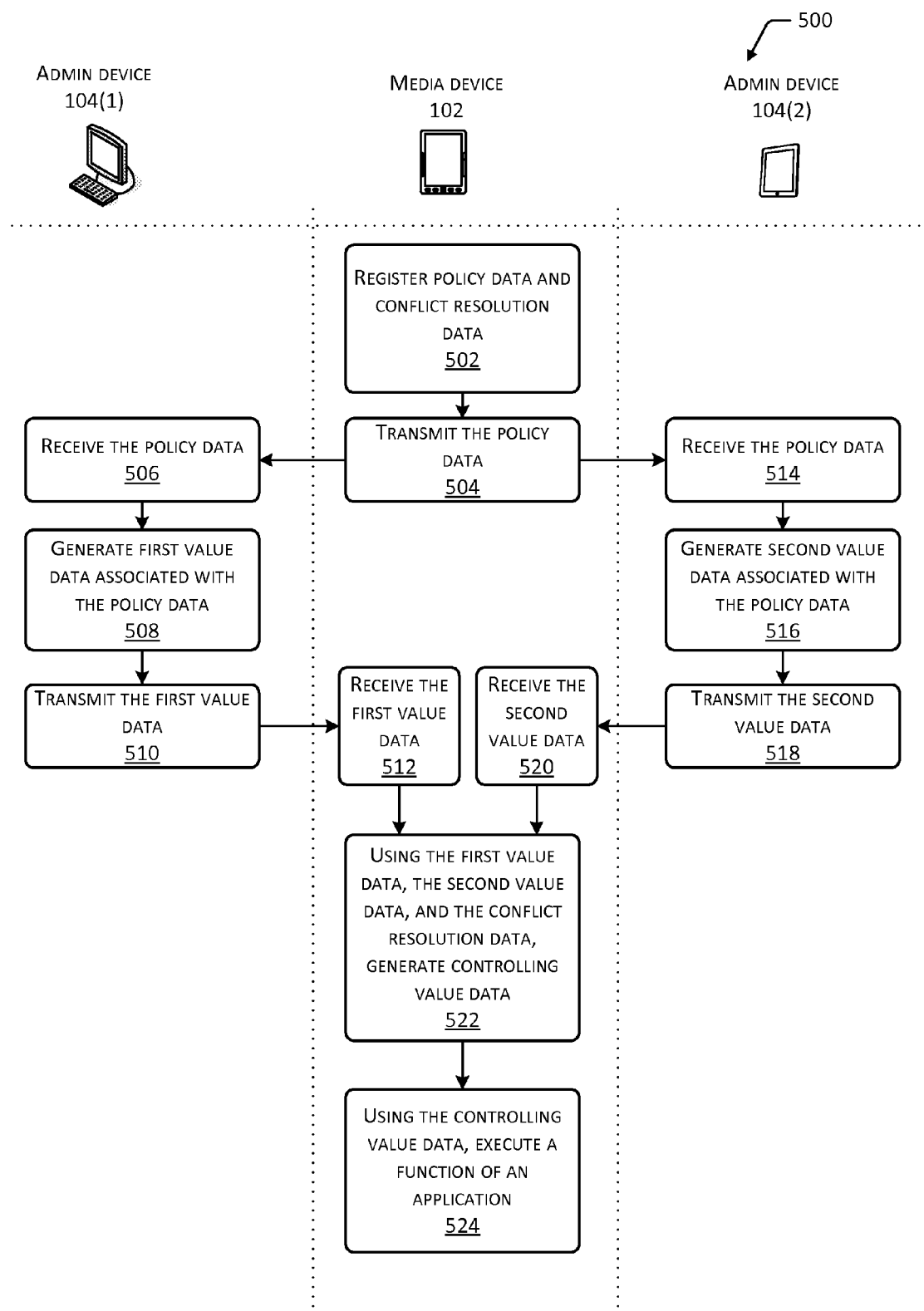
FIG. 5 is a flow diagram illustrating a process of generating the controlling value data using value data received from different administrative devices.

FIG. 5 is a flow diagram illustrating a process 500 of generating controlling value data 124 based on first value data 120 received from a first administrative device 104(1), and second value data 120 received from a second administrative device 140(2). Although the process 500 is described with reference to the flowchart illustrated in FIG. 5, many other methods performing the acts associated with the process 500 may be used. For example, the order of many of the steps may be changed, some of the steps described may be optional, and additional steps may be included.

At block 502, the media device 102 registers the policy data 114 and the conflict resolution data 116. For example, the policy data 114 may comprise data which enables one or more users to block or allow sports content for the book application 202(1), and the conflict resolution data 116 may include data which causes the media device 102 to allow sports content if the media device 102 receives at least one request indicating a request to allow sports content.

In some implementations, the media device 102 registers the policy data 114 and the conflict resolution data 116 with the OS module 118. In other implementations, the media device 102 registers the policy data 114 and the conflict resolution data 116 with the memory 410.

In some implementations, when the media device 102 installs the application 106, the media device 102 registers the policy data 114 and the conflict resolution data 116. In one example, installing the application 106 comprises making the application 106 ready for execution by the media device 102. The media device 102 may include an installation module that installs the application 106 onto the media device 102.

At block 504, the media device 102 transmits the policy data 114 to the administrative device 104(1) and the administrative device 104(2). In some implementations, the media device 102 transmits the policy data 114 to the administrative device 104(1) in response to installing the policy data 114 with the media device 102. In other implementations, the media device 102 transmits the policy data 114 to a particular administrative device 104 in response to receiving a request for the policy data 114 from the administrative device 104.

At block 506, the administrative device 104(1) receives the policy data 114. At block 508, the administrative device 104(1) generates first value data 120 associated with the policy data 114. The administrative device 104(1) may generate the first value data 120 associated with the policy data 114 based on inputs received from one or more of the input devices. Continuing with the example, the administrative device 104(1) may generate first value data 120 representing a request to block the sports content for the book application 202(1). At block 510, the administrative device 104(1) transmits the first value data 120. At block 512, the media device 102 receives the first value data 120.

At block 514, the administrative device 104(2) receives the policy data 114. At block 516, the administrative device 104(2) generates second value data 120 associated with the policy data 114. The administrative device 104(2) may generate the second value data 120 associated with the policy data 114 based on inputs received from one or more of the input devices. Continuing with the example, the administrative device 104(2) may generate second value data 120 representing a request to allow sports content for the book application 202(1). At block 518, the administrative device 104(2) transmits the second value data 120. At block 520, the media device 102 receives the second value data 120.

At block 522, using the first value data 120, the second value data 120 and the conflict resolution data 116, the media device 102 generates the controlling value data 124. Continuing with the example, the media device 102 generates the controlling value data 124 which enables the book application 202(1) to view sports content because at least one of the first value data 120 and the second value data 120 includes data indicating a request for the book application 202(1) to allow sports content. In this example, because the administrative device 104(2) generated second value data 120 representing a request to allow sports content for the book application 202(1), the controlling value data 124 comprises data which enables the book application 202(1) to view sports content.

In some implementations, the media device 102 generates the controlling value data 124 in response to the execution of the application 106. Continuing with the example, the media device 102 may generate the controlling value data 124 which enables the book application 202(1) to view sports content when the book application 202(1) is executed. In another example, the media device 102 may generate the controlling value data 124 which enables the book application 202(1) to view sports content when the media device 102 receives a request for the book application 202(1) to display sports content.

At block 524, using the controlling value data 124, the media device 102 executes a function of the application 106. Continuing with the example, the user of the media device 102 may cause the book application 202(1) to download a book which includes sports content.

Figure 6:
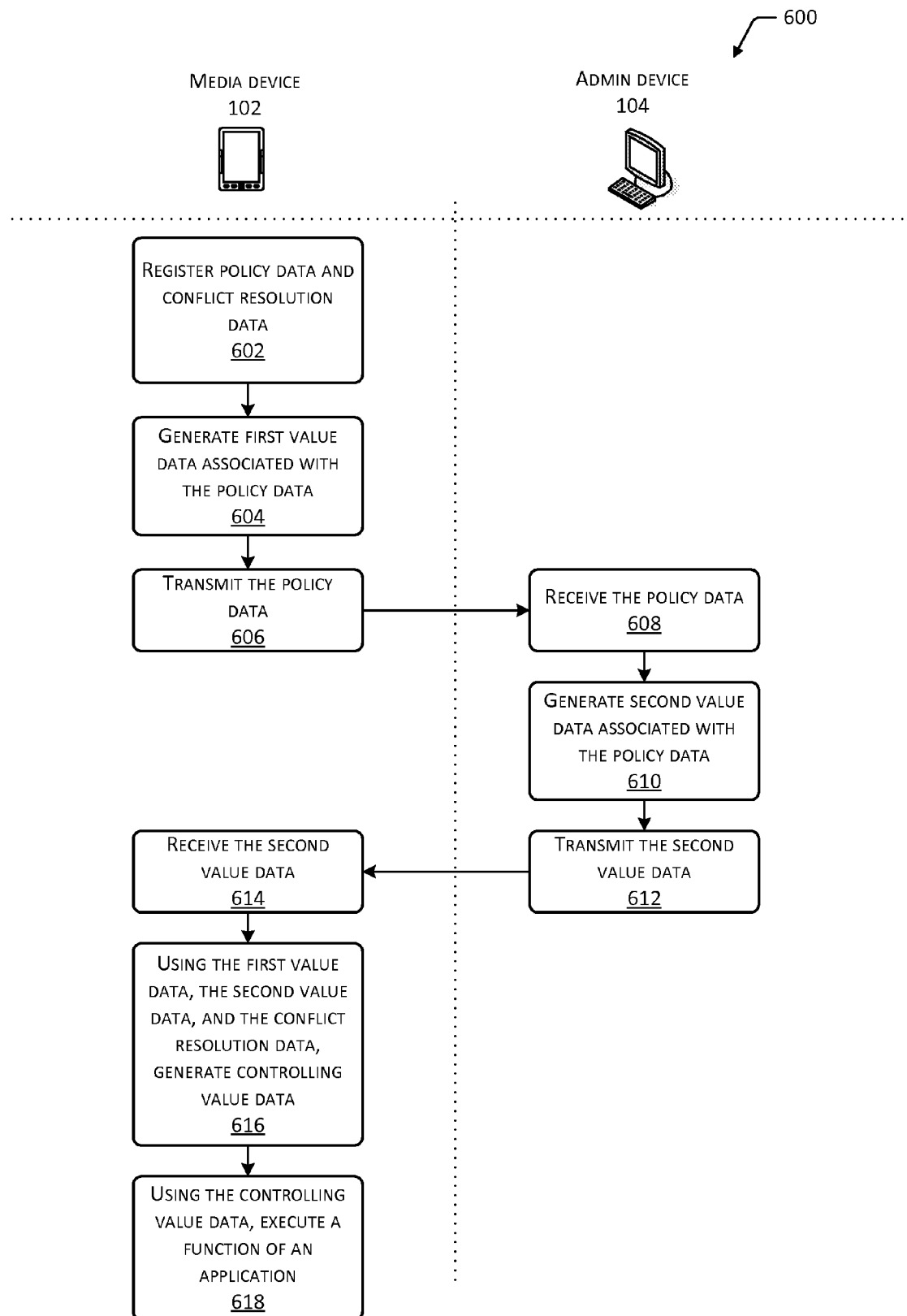
FIG. 6 is a flow diagram illustrating a process of generating the controlling value data based on value data generated by the media device and value data received from at least one administrative device.

FIG. 6 is a flow diagram illustrating a process 600 of generating the controlling value data 124 using value data 120 that is generated by the media device 102. Although the process 600 is described with reference to the flowchart illustrated in FIG. 6, many other methods performing the acts associated with the process 600 may be used. For example, the order of many of the steps may be changed, some of the steps described may be optional, and additional steps may be included.

At block 602, the media device 102 registers the policy data 114 and the conflict resolution data 116. For example, the policy data 114 may enable one or more users to request that the music application 202(3) block or allow one or more designated songs. The conflict resolution data 116 may include data which causes the media device 102 to block the one or more designated songs if at least one value data 120 includes data representative of a request to block the one or more designated songs.

At block 604, the media device 102 generates first value data 120 associated with the policy data 114. Continuing with the example, the media device 102 may be operated by a child that uses an input device which causes the media device 102 to generate first value data 120 representative of a request from the child for the music application 202(3) to play Song A.

At block 606, the media device 102 transmits the policy data 114 to the administrative device 104. In some implementations, before transmitting the policy data 114, the media device 102 determines whether the administrative device 104 has permission to receive the policy data 114. In response to a determination that the administrative device 104 has permission to receive the policy data 114, the media device 102 transmits the policy data 114 to the administrative device 104.

At block 608, the administrative device 104 receives the policy data 114. At block 610, the administrative device 104 generates second value data 120 associated with the policy data 114. Continuing with the example, the administrative device 104 may be operated by a parent that uses an input device which causes the administrative device 104 to generate second value data 120 representative of a request from the parent for the music application 202(3) to block the play of Song A. At block 612, the administrative device 104 transmits the second value data 120.

At block 614, the media device 102 receives the second value data 120. At block 616, using the first value data 120, the second value data 120 and the conflict resolution data 116, the media device generates the controlling value data 124. Continuing with the example, the media device 102 generates controlling value data 124 which causes the media device 102 to block the play of Song A. In this example, because the second value data 120(2) comprises data representative of a request for the music application 202(3) to block the Song A, the music application 202(3) is configured to block the Song A.

At block 618, using the controlling value data 124, the media device 102 executes a function of the application 106. Continuing with the example, if the child user of the media device 102 attempts to download the Song A, the music application 202(3) will block the download of Song A.

Figure 7:
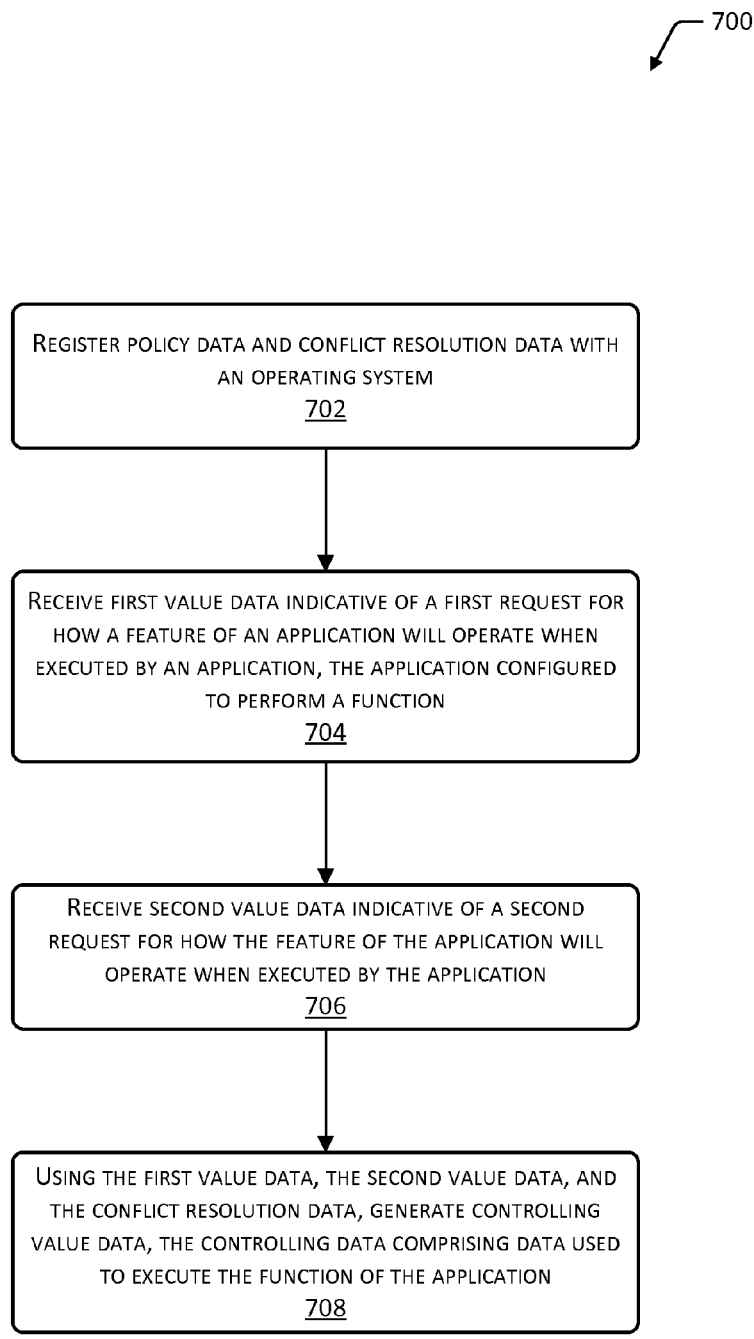
FIG. 7 is a flow diagram illustrating a process of registering the policy data and the conflict resolution data with the operating system, and generating the controlling value data.

FIG. 7 is a flow diagram illustrating a process 700 of registering policy data 114 and conflict resolution data 116 with the OS module 118, and generating controlling value data 124. Although the process 700 is described with reference to the flowchart illustrated in FIG. 7, many other methods performing the acts associated with the process 700 may be used. For example, the order of many of the steps may be changed, some of the steps described may be optional, and additional steps may be included.

At block 702, the media device 102 registers policy data 114 and conflict resolution data 116 with the OS module 118. In some implementations, in response to installing the application 106, the media device 102 registers the policy data 114 and the conflict resolution data 116. In other implementations, in response to receiving the application 106, the media device 102 registers the policy data 114 and the conflict resolution data 116. In another implementation, in response to receiving an update for the application 106, the media device 102 may register policy data 114 and the conflict resolution data 116 which are associated with the update. The media device 102 may be configured to determine whether the update includes new policy data 114 or new conflict resolution data 116 in response to installing the update.

The policy data 114 may comprise data representative of one or more policies. In one implementation, for a book application 202(1), the policy data 114 includes at least one of a book size feature configured to control the size of downloadable digital books, a content category restriction feature configured to control access to particular content categories, or a book title feature configured to control access to one or more designated digital books. In another implementation, for the email application 202(2), the policy data 114 includes at least one of a password length feature configured to control a length of a password, an attachment type feature configured to control types of attachments which may be attached to an email using the email application 202(2), or an attachment size feature configured to control an attachment size of the attachments.

In some implementations, the policy data 114 comprises data which enables one or more users to request for the media device 102 to block access to one or more applications 106. In response to the media device 102 blocking the one or more applications 106, the media device 102 may be configured to present information with a user interface indicating a reason the one or more applications 106 was blocked. For example, the media device 102 may display a message indicating that the application 106 may not be accessed because the media device 102 received a request to block the application 106 from the administrative device 104.

In some implementations, the policy data 114 comprises data which enables one or more users to request the media device 102 block access to a particular device connected to the media device 102. For example, the one or more applications 106 may include a device driver comprising software that operates or controls a particular device (e.g., a camera) connected to the media device 102. In this example, the device driver may enable one or more users to request the media device 102 to block or allow the use of a camera connected to the media device 102.

The application 106 may be configured to perform a function. For example, one application 106 may include a book application 202(1) configured to cause the media device 102 to present a digital book, and another application 106 may include the email application 202(2) configured to enable users to exchange messages At block 704, the media device 102 receives first value data 120 indicative of a first request for how the feature of the application 106 will operate when executed by the application 106, wherein the application 106 is configured to perform a function. The media device 102 may receive the first value data 120 from one or more administrative devices 104. In some implementations, the media device 102 may receive the first value data 120 from the media device 102. For example, a user of the media device 102 may use an input device of the media device 102 to enter in values for the first value data 120.

In some implementations, the first value data 120 comprises a set of values. For example, for the book application 202(1) which enables a user to block designated book titles, the set of values comprise "Title 1", "Title 2", and "Title 3".

At block 706, the media device 102 receives second value data 120 indicative of a second request for how the feature of the application 106 will operate when executed by the application 106. The media device 102 may receive the second value data 120 from one or more administrative devices 104. In some implementations, the media device 102 may receive the second value data 120 from the media device 102. For example, a user of the media device 102 may use an input device of the media device 102 to enter in values for the second value data 120.

In some implementations, the media device 102 receives the first value data 120 and the second value data 120 from a server. For example, a first administrative device 104 may generate the first value data 120 and transmit the first value data 120 to the server. A second administrative device 104 may generate the second value data 120 and transmit the second value data 120 to the server. Thereafter, the server may be configured to transmit the first value data 120 and the second value data 120 to the media device 102.

The second value data 120 may comprise a set of values. For example, for the book application 202(1) which enables a user to block designated book titles, the set of values may include a set of values comprising "Title 2", "Title 3", and "Title 4".

At block 708, using the first value data 120, the second value data 120 and the conflict resolution data 116, the media device 102 generates controlling value data 124 used to execute the function of the application 106. In some implementations, the controlling value data 124 is generated by taking an intersection or a union of a first set of values of the first value data 120 and a second set of values of the second data 120.

The conflict resolution data 116 may comprise data for resolving one or more differences between the first value 120 and the second value 120. In one example, the first conflicting resolution data 116 includes a Boolean value, such as true or false. As described above, the media device 102 may resolve the differences between the values 120 using the Boolean value.

In some implementations, the conflict resolution data 116 comprises data configured to cause the media device 102 to take the union of different sets of values. For example, the first value data 120 may include a first set of values which include Song A, Song B, and Song C. The second value data 120 may include a second set of values which include Song B, Song C, and Song D. In this example, the union of the first set of values and the second set of values is Song A, Song B, Song C, and Song D.

In some implementations, the conflict resolution data 116 comprises data configured to cause the media device 102 to take the intersection of different sets of values. For example, the first value data 120 may include a first set of values which include "Title 1", "Title 2", "Title 3", and "Title 4". The second value data 120 may include a second set of values which include "Title 2", "Title 4", "Title 5", and "Title 6". In this example, the intersection of the first set of values and the second set of values is "Title 2" and "Title 4".

The media device 102 may use the controlling value data 124 to execute a function of the application 106. Executing the function of the application 106 may comprise carrying out certain instructions of the application 106. In one example, the function module 112 receives the controlling value data 124 as an input. For example, the function module 112 may be configured to cause the media device 102 to display the content. If the controlling value data 124 is configured to cause the function module 112 to block sports content, and the function module 112 receives the controlling value data 124 as an input, the function module 112 may cause the media device 102 to block the sports content. In another example, the controlling value data 124 is stored in the memory 410, and the function module 112 is configured to access the controlling value data 124, and use the controlling value data 124 to execute a function of the application 106.

In some implementations, the media device 102 generates the controlling value data 124 in response to a request for the application 106 to execute a function. For example, the media device 102 may generate the controlling value data 124 which enables the media device 102 to connect to the network using Wi-Fi® or WAN when the media device 102 receives a request to connect to the network using Wi-Fi® or WAN.

In some implementations, the controlling value data 124 causes the media device 102 to require a password to be entered to execute the function of the application. For example, the media device 102 may receive first value data 120 indicating a request for book application 202(1) to block sports content, and second value data 120 indicating a request for the book application 202(1) to allow sports content. In this example, the media device 102 generates controlling value data 124 such that the media device 102 may access the sports content once a designated password is received.

In some implementations, the media device 102 may generate the first value data 120 and the second value data 120. For example, a parent may log onto a child's media device 102 and request that the book application 202(1) allow sports content, which causes the child's media device 102 to generate the first value data 120 representing the request to allow the sports content. Afterwards, the parent may log off, and a teacher may log onto the child's media device 102 and request that the book application 202(1) block the sports content, which causes the child's media device 102 to generate the second value data 120 representing the request to block the sports content.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A media device comprising:
a processor; and
a memory device coupled to the processor, the memory device storing instructions which when executed by the processor, cause the processor to:
   receive an application configured to perform a function, the application including:
      first policy data which enables one or more users to request how a first feature of the function will operate upon execution of the application; and
      first conflict resolution data;
   register with an operating system of the media device the first policy data and the first conflict resolution data of the application;
   transmit a first request to a first administrative device for how the first feature of the function will operate upon execution of the application;
   transmit a second request to a second administrative device for how the first feature of the function will operate upon execution of the application;
   receive first value data from the first administrative device, the first value data being associated with the first policy data and representative of the first request;
   receive second value data from the second administrative device, the second value data being associated with the first policy data and representative of the second request;
   generate first controlling value data using the first value data, the second value data, and the first conflict resolution data, wherein the first conflict resolution data is representative of data for resolving one or more differences between the first value data received from the first administrative device and the second value data received from the second administrative device; and
   execute the function of the application using the first controlling value data.

2. The media device of claim 1, wherein:
the application includes:
   second policy data which enables the one or more users to request how a second feature of the function will operate upon execution of the application; and
   second conflict resolution data; and
the instructions, when executed by the processor, cause the processor to:
   register with the operating system of the media device the second policy data and the second conflict resolution data of the application;
   transmit a third request to the first administrative device for how the second feature of the function will operate upon execution of the application;
   transmit a fourth request to the second administrative device for how the second feature of the function will operate upon execution of the application;
   receive third value data from the first administrative device, the third value data being associated with the second policy data and representative of the third request;
   receive fourth value data from the second administrative device, the fourth value data being associated with the second policy data and representative of the fourth request;
   generate second controlling value data using the third value data, the fourth value data, and the second conflict resolution data, wherein the second conflict resolution data is representative of data for resolving one or more differences between the third value data received from the first administrative device and the fourth value data received from the second administrative device; and
   execute the function of the application using the second controlling value data.

3. The media device of claim 1, wherein:
the first value data received from the first administrative device includes a first set of values;
the second value data received from the second administrative device includes a second set of values; and
the first controlling value data for executing the application is generated by taking an intersection of the first set of values and the second set of values.

4. A non-transitory computer readable medium storing instructions, which when executed by a processor, cause the processor to perform actions comprising:
registering with an operating system first policy data and first conflict resolution data, the first policy data enabling one or more users to request how a first feature of an application will operate upon execution of the application, the application configured to perform a function, the first conflict resolution data being associated with the first policy data;

receiving first value data from a first administrative device representative of a first request for how the first feature of the function will operate upon execution of the application, the first value data being associated with the first policy data;

receiving second value data from a second administrative device representative of a second request for how the first feature of the function will operate upon the execution of the application, the second value data being associated with the first policy data; and generating first controlling value data using the first value data, the second value data, and the first conflict resolution data, the first conflict resolution data including data for resolving one or more differences between the first value data received from the first administrative device and the second value data received from the second administrative device, the first controlling value data including data used to execute the function of the application.

5. The non-transitory computer readable medium of claim 4, the actions further comprising:

registering with the operating system second policy data and second conflict resolution data, the second policy data enabling one or more users to request how a second feature of the function of the application will operate upon execution of the application;

receiving third value data from the first administrative device representative of a third request for how the second feature of the function will operate upon execution of the application;

receiving fourth value data from the second administrative device representative of a fourth request for how the second feature of the function will operate upon the execution of the application; and generating second controlling value data using the third value data, the fourth value data, and the second conflict resolution data, the second conflict resolution data including data for resolving one or more differences between the third value data received from the first administrative device and the fourth value data received from the second administrative device, the second controlling value data including data used to execute the function of the application.

6. The non-transitory computer readable medium of claim 4, the actions further comprising:

receiving the application from a content server;

installing the application; and in response to installing the application, registering with the operating system the first policy data and the first conflict resolution data.

7. The non-transitory computer readable medium of claim 4, the actions further comprising:

receiving an update for the application from a content server;

installing the update;

in response to installing the update for the application, determining the update includes second policy data and second conflict resolution data; and registering with the operating system the second policy data and the second conflict resolution data.

8. The non-transitory computer readable medium of claim 4, wherein:

the application includes a book application configured to present downloadable digital books; and the first feature includes at least one of:

a book size feature configured to control the size of downloadable digital books;

a content category restriction feature configured to control access to particular content categories; or a book title feature configured to control access to one or more designated digital books.

9. The non-transitory computer readable medium of claim 4, wherein:

the application includes an email application configured to exchange digital messages; and the first feature includes at least one of:

a password length feature configured to control a length of a password;

an attachment type feature configured to control types of attachments of an email generated by the email application; or an attachment size feature configured to control an attachment size of the attachments.

10. The non-transitory computer readable medium of claim 4, wherein:

the first value data is received from a server; and the second value data is received from the server.

11. The non-transitory computer readable medium of claim 4, wherein:

the first conflict resolution data includes a Boolean value, the Boolean value being true or false; and the differences between the first value data and the second value data are resolved using the Boolean value.

12. The non-transitory computer readable medium of claim 4, wherein:

the first value data includes a first set of values;

the second value data includes a second set of values; and the first controlling value data for executing the application is generated by taking a union of the first set of values and the second set of values.

13. The non-transitory computer readable medium of claim 4, wherein:

the first value data includes a first set of values;

the second value data includes a second set of values; and the first controlling value data for executing the application is generated by taking an intersection of the first set of values and the second set of values.

14. The non-transitory computer readable medium of claim 4, the actions further comprising:

registering with the operating system second policy data and second conflict resolution data, the second policy data enabling one or more users to block access to a second application; and receiving third value data representative of a third request for blocking access to the second application; and using the third value data, generating second controlling value data configured to block access to the second application.

15. The non-transitory computer readable medium of claim 14, the actions further comprising, in response to blocking the second application, presenting information with a user interface indicating a reason the second application was blocked.

16. The non-transitory computer readable medium of claim 4, wherein the first controlling value data causes a media device to require a password to be received to execute the function of the application.

17. A first media device comprising:

a processor; and a memory device coupled to the processor, the memory device storing instructions which when executed by the processor, cause the processor to:

receive an application configured to perform a function, the application including:
   policy data representative of a policy, the policy configured to control a feature of the function; and
   conflict resolution data;
transmit the policy data to a second media device;
generate first value data from the first media device, the first value data representative of a first request for controlling the feature of the function;
receive second value data from the second media device, the second value data representative of a second request for controlling the feature of the function;
generate controlling value data using the first value data, the second value data, and the conflict resolution data, the conflict resolution data including data for resolving one or more differences between the first value data generated from the first media device and the second value data received from the second media device; and
execute the function of the application using the controlling value data.

18. The first media device of claim 17, wherein the instructions, when executed by the processor, cause the processor to, in response to a determination that the second media device has permission to receive the policy data, transmit the policy data to the second media device.

19. The first media device of claim 17, further comprising an input device coupled to the processor, wherein the first value data is generated based on input data received from the input device.

20. The first media device of claim 17, wherein:
the first value data includes a first set of values;
the second value data includes a second set of values; and
the first controlling value data for executing the application is generated by taking a union of the first set of values and the second set of values.

* * * * *